United States Patent
Forte et al.

(10) Patent No.: US 6,630,260 B2
(45) Date of Patent: Oct. 7, 2003

(54) WATER VAPOR TRANSFER DEVICE FOR A FUEL CELL POWER PLANT

(75) Inventors: Jameson R. Forte, Rochester, NY (US); Steven Burch, Honeoye Falls, NY (US); Mark A. Brundage, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/910,331

(22) Filed: Jul. 20, 2001

(65) Prior Publication Data

US 2003/0017373 A1 Jan. 23, 2003

(51) Int. Cl.7 .............................. H01M 8/04; H01M 8/06
(52) U.S. Cl. .............................. 429/19; 429/20; 429/26
(58) Field of Search .............................. 429/12, 17, 19, 429/20, 26, 30; 48/61

(56) References Cited

U.S. PATENT DOCUMENTS

| | | | |
|---|---|---|---|
| 3,134,697 A | | 5/1964 | Niedrach |
| 3,976,507 A | * | 8/1976 | Bloomfield ............... 429/17 |
| 4,522,894 A | * | 6/1985 | Hwang et al. ............. 429/17 |
| 4,622,275 A | * | 11/1986 | Noguchi et al. ........... 429/19 |
| 4,650,722 A | | 3/1987 | Brown |
| 5,272,017 A | | 12/1993 | Swathirajan |
| 5,316,871 A | | 5/1994 | Swathirajan |
| 5,360,679 A | * | 11/1994 | Buswell et al. ........... 429/19 |
| 5,478,662 A | | 12/1995 | Strasser |
| 5,543,238 A | | 8/1996 | Strasser |
| 5,763,113 A | | 6/1998 | Meltser |
| 6,007,931 A | | 12/1999 | Fuller |
| 6,013,385 A | | 1/2000 | DuBose |
| 6,077,620 A | | 6/2000 | Pettit |
| 6,099,484 A | | 8/2000 | Douglas |
| 6,106,964 A | * | 8/2000 | Voss et al. ............... 429/13 |
| 6,132,689 A | | 10/2000 | Skala |
| 6,159,626 A | | 12/2000 | Keskula |

FOREIGN PATENT DOCUMENTS

| | | |
|---|---|---|
| DE | 42 01 632 A1 | 7/1993 |
| EP | 0 977 293 A2 | 2/2000 |
| EP | 1 066 876 A1 | 1/2001 |
| JP | 6-333583 * | 12/1994 |

OTHER PUBLICATIONS

International Search Report published with WO 03/09412, Jan. 30, 2003.

* cited by examiner

Primary Examiner—Randy Gulakowski
Assistant Examiner—Jonathan Crepeau
(74) Attorney, Agent, or Firm—Karl F. Barr, Jr.; Cary W. Brooks; Linda M. Deschere

(57) ABSTRACT

A fuel cell system that extracts water from the effluent of a fuel cell for supply to other components of the fuel cell system that require water. A preferred embodiment is a fuel cell system, for the production of electricity from hydrogen gas and an oxidant, comprising:

(a) a fuel cell comprising an anode input for a hydrogen-containing anode supply stream, a cathode input for an oxidant-containing cathode supply stream, and a cathode output for cathode effluent comprising water produced by said fuel cell; and (b) a water transfer device, connected to said fuel cell, that transfers water from said cathode effluent to said anode supply stream.

20 Claims, 5 Drawing Sheets

WATER VAPOR TRANSFER DEVICE FOR A FUEL CELL POWER PLANT

BACKGROUND OF THE INVENTION

This invention relates to fuel cell power plants for the production of electricity from the electrochemical reaction of hydrogen and an oxidant. Preferred plants produce hydrogen from hydrocarbon fuel. In particular, this invention relates to fuel cell power plants having a device that transfers water vapor from the effluent of a fuel cell to components of the power plant that require water.

Fuel cells are devices that convert electrochemical energy from the reaction of reducing and oxidizing chemicals, into electricity. Fuel cells have been used as a power source in many applications, and can offer significant benefits over other sources of electrical energy, such as improved efficiency, reliability, durability, cost and environmental benefits. In particular, electric motors powered by fuel cells have been proposed for use in cars and other vehicles to replace internal combustion engines.

Fuel cells typically use hydrogen and air as the reducing and oxidizing materials to produce electrical energy, and water. The cell generally comprises an anode electrode and a cathode electrode separated by an electrolyte. Hydrogen is supplied to the anode electrode, and oxygen (or air) is supplied to the cathode electrode. The hydrogen gas is separated into electrons and hydrogen ions (protons) at the anode. The hydrogen ions pass through the electrolyte to the cathode; the electrons travel to the cathode through the power circuit (e.g., to a motor). At the cathode, the hydrogen ions, electrons, and oxygen then combine to form water. The reactions at the anode and cathode are facilitated by a catalyst, typically platinum.

The anode and cathode of the fuel cell are separated by an electrolyte. There are several types of fuel cells, each incorporating a different electrolyte system, and each having advantages that may make them particularly suited to given commercial applications. One type is the proton exchange membrane (PEM) fuel cell, which employs a thin polymer membrane that is permeable to protons but not electrons. PEM fuel cells, in particular, are well suited for use in vehicles, because they can provide high power and weigh less than other fuel cell systems.

The membrane in the PEM fuel cell is part of a membrane electrode assembly (MEA) having the anode on one face of the membrane, and the cathode on the opposite face. The membrane is typically made from an ion exchange resin such as a perfluoronated sulfonic acid. The MEA is sandwiched between a pair of electrically conductive elements that serve as current collectors for the anode and cathode, and contain appropriate channels and/or openings for distribution of the fuel cell's gaseous reactants over the surfaces of the respective anode and cathode catalysts.

The anode and cathode typically comprise finely divided catalytic particles, supported on carbon particles, and admixed with a proton conductive resin. The catalytic particles are typically precious metal particles, such as platinum. Such MEAs are, accordingly, relatively expensive to manufacture and require controlled operating conditions in order to prevent degradation of the membrane and catalysts. These conditions include proper water management and humidification, and control of catalyst fouling constituents, such as carbon monoxide. Typical PEM fuel cells and MEAs are described in U.S. Pat. No. 5,272,017, Swathirajan et al., issued Dec. 21, 1993, and U.S. Pat. No. 5,316,871, Swathirajan et al., issued May 31, 1994.

The voltage from an individual cell is only about 1 volt. Accordingly, to meet the higher power requirements of vehicles and other commercial applications, several cells are combined in series. This combination is typically arranged in a "stack" surrounded by an electrically insulating frame that has passages for directing the flow of the hydrogen and oxygen (air) reactants, and the water effluent. Because the reaction of oxygen and hydrogen also produces heat, the fuel cell stack must also be cooled. Arrangements of multiple cells in a stack are described in U.S. Pat. No. 5,763,113, Meltser et al., issued Jun. 9, 1998; and U.S. Pat. No. 6,099,484, Rock, issued Aug. 8, 2000.

For many applications, it is desirable to use a readily available hydrocarbon fuel, such as methane (natural gas), methanol, gasoline, or diesel fuel, as the source of hydrogen for the fuel cell. Liquid fuels, such as gasoline, are particularly suited for vehicular applications. Liquid fuels are relatively easy to store, and there is an existing commercial infrastructure for their supply. However, hydrocarbon fuels must be dissociated to release hydrogen gas for fueling the fuel cell. Power plant fuel processors for providing hydrogen contain one or more reactors or "reformers" wherein the fuel reacts with steam, and sometimes air, to yield reaction products comprising primarily hydrogen and carbon dioxide.

In general, there are two types of reforming systems: steam reformers, and autothermal reformers. Each system has operating characteristics that make it more or less suited to the use of particular types of fuels and in particular applications. In steam reformation, a hydrocarbon fuel (typically methane or methanol) and water (as steam) are reacted to generate hydrogen and carbon dioxide. This reaction is endothermic, requiring the addition of heat. In preferred systems, this heat is provided by a combustor that burns hydrogen that remains unreacted after the reformate passes through the fuel cell stack.

In an autothermal reformation process, a hydrocarbon fuel (typically gasoline), steam and air are supplied to a primary reactor that performs two reactions. One is a partial oxidation reaction, where air reacts with the fuel exothermally, and the other is the endothermic steam reforming reaction (as in steam reformation). The heat from the exothermic reaction is used in the endothermic reaction, minimizing the need for an external heat source.

A by-product of the reaction, in both steam and autothermal reforming, is carbon monoxide. Unfortunately, carbon monoxide will degrade the operation of the fuel cell, particularly PEM fuel cells. Thus, reactors downstream of the primary reactor are required to lower the carbon monoxide concentration in the hydrogen-rich reformate to levels tolerable in the fuel cell stack. Downstream reactors may include a water/gas shift (WGS) reactor and a preferential oxidizer (PrOx) reactor. The WGS reactor catalytically converts carbon dioxide and water to hydrogen and carbon dioxide. The PrOx reactor selectively oxidizes carbon monoxide to produce carbon dioxide, using oxygen from air as an oxidant. Control of air feed to the PrOx reactor is important to selectively oxidize carbon monoxide, while minimizing the oxidation of hydrogen to water.

Fuel cell systems that dissociate a hydrocarbon fuel to produce a hydrogen-rich reformate for consumption by PEM fuel cells are well known in the art. Such systems are described in U.S. Pat. No. 6,077,620, Pettit, issued Jun. 20, 2000; European Patent Publication 977,293, Skala, et al., published Feb. 2, 2000; and U.S. Pat. No. 4,650,722, Vanderborgh, et al., issued Mar. 17, 1987.

The use of hydrocarbon reformate fuel cell systems in cars and other vehicles presents special concerns. In addition to the desirability of using readily-available liquid fuels, discussed above, the reformer and fuel cell systems must be relatively light in weight, and must be able to operate efficiently under a wide range of ambient conditions (e.g., under a range of temperatures and humidity conditions). They should also be able to be started quickly, so as to produce power within a short time interval after start-up of the vehicle. Thus, it is desirable to minimize the amount of heating of reactant components for the reformer. It is also desirable to minimize the amount of liquid water that must be handled in the system, particularly to avoid the need to replenish water within the system.

As discussed above, there are several components in the reformate fuel cell system that require water, particularly including the reformer that requires steam as a reactant, the WGS reactor, and the fuel cell that requires humidification of the MEA in order to function properly. A common approach to enhancing water balance in fuel cell systems is use of condensing heat exchangers at various points in the system. For example, heat exchangers are used downstream of the reformer to cool the reformate exhaust to a temperature at or below its dew point so as to precipitate water. The water is separated from the gaseous reformate, and stored in a reservoir. The water is then returned to the reformer where it is heated to create steam. Heat exchangers are also used to cool the exhaust stream exiting the cathode of the fuel cell so as to condense water which is used in humidifying the MEA. The use of heat exchangers presents issues, however. For example, the water recovery efficiency of heat exchangers is reduced as the ambient temperature increases. Large radiators may be required so as to dissipate the heat of condensation. Moreover, the liquid condensate produced by the heat exchangers must be vaporized for re-use in the system, creating an additional energy load and inefficiencies in the system.

Attempts to address the water balance needs in fuel cell systems have been described in the art. See, for example, German Patent Disclosure 42 01632, Strasser, published Jul. 29, 1993; U.S. Pat. No. 6,007,931, Fuller et al., issued Dec. 28, 1999; and U.S. Pat. No. 6,013,385, DuBose, issued Jan. 11, 2000. However, water management systems among those known in the art do not adequately address these needs, due to problems such as their inability to maintain true water balance over a wide range of operating conditions, mechanical complexity and reliability, increased system energy requirements, and potential safety issues.

SUMMARY OF THE INVENTION

The present invention provides a fuel cell system that extracts water from the effluent of a fuel cell for supply to other components of the fuel cell system that require water. Accordingly, the present invention provides a fuel cell system for the production of electricity from hydrogen and an oxidant, comprising:

(a) a fuel cell for the production of electricity using hydrogen and an oxidant; and (b) a water transfer device that transfers water vapor from the anode or cathode effluent of said fuel cell to other components of the fuel cell system. A preferred embodiment is a fuel cell system, for the production of electricity from hydrogen gas and an oxidant, comprising:

(a) a fuel cell comprising an anode input for a hydrogen-containing anode supply stream, a cathode input for an oxidant-containing cathode supply stream, and a cathode output for cathode effluent comprising water produced by said fuel cell; and (b) a water transfer device, connected to said fuel cell, that transfers water from said cathode effluent to said anode supply stream. Another preferred embodiment is a fuel cell power plant comprising:

(a) a reactor for the production of a reformate supply stream using a reactor oxidant stream and a reactor hydrocarbon fuel stream, wherein said reformate supply stream comprises water;

(b) a first water transfer device that transfers water from said reformate supply stream to a one or both of said reactant streams, comprising a water-transfer membrane;

(c) a fuel cell comprising an anode input for said reformate supply stream, a cathode input for a cathode oxidant supply stream, an anode output for an anode effluent stream, a cathode output for an cathode effluent stream, wherein either or both of said anode effluent and said cathode effluent comprise water produced by said fuel cell; and (d) a second water transfer device, connected to said fuel cell, that transfers water from one or both of said effluent streams to one or more of said oxidant reactant stream, said reformate supply stream and said cathode oxidant supply stream.

It has been found that such water transfer devices afford significant advantages over water management systems known in the art. In particular, such systems afford advantages maintaining an overall water balance in the system under a range of operating conditions, reduced energy requirements, reduced component complexity and reliability, and enhanced operating safety.

DETAILED DESCRIPTION

Figure 1:
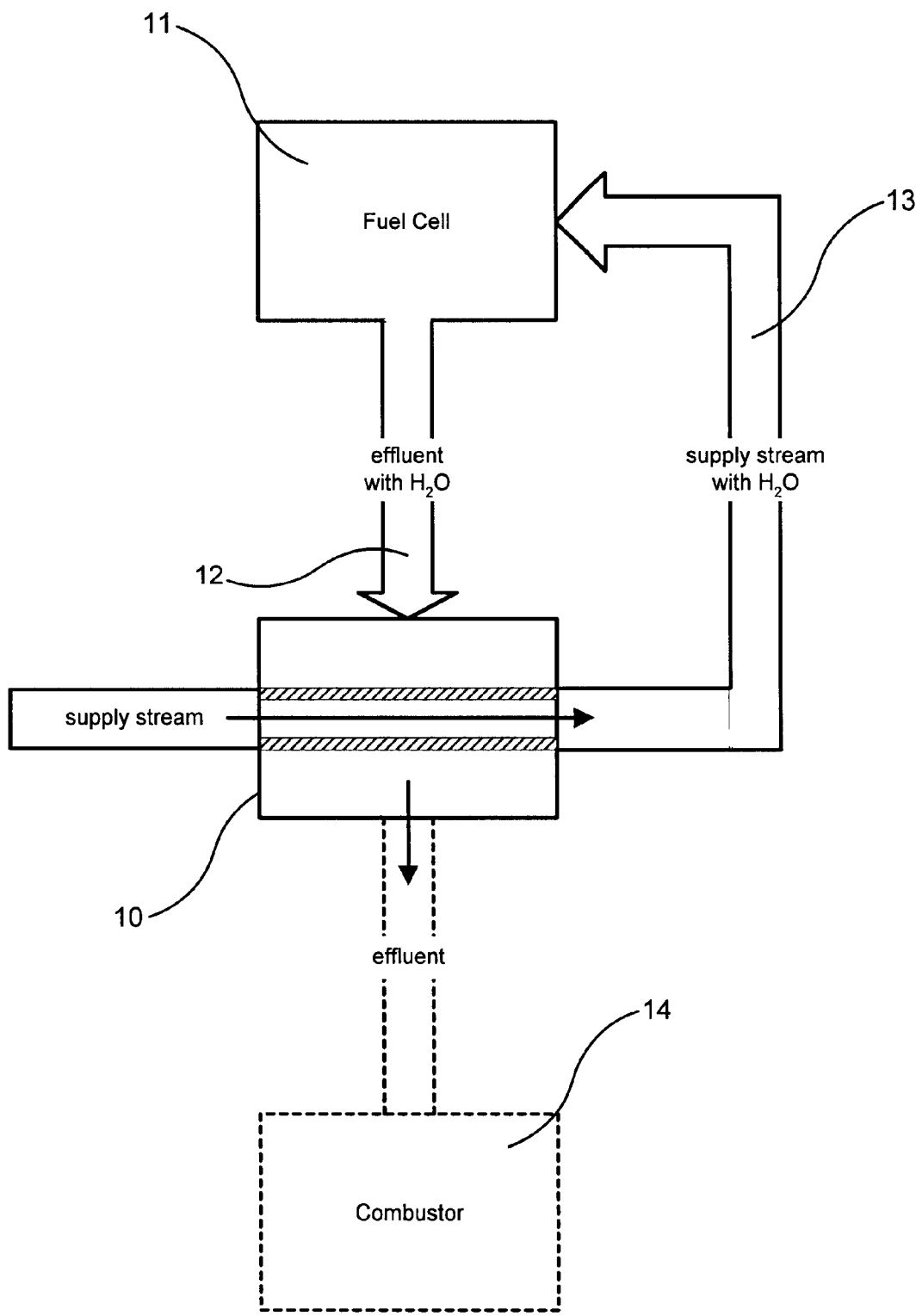
FIG. 1 is a diagram depicting a fuel a fuel cell system of this invention showing the flow of materials in and out of the fuel cell and water transfer device.

The present invention provides a fuel cell system. As referred to herein, a "fuel cell system" is an apparatus comprising a fuel cell and a water transfer device. The water vapor transfer device transfers water vapor from an effluent of the fuel cell to another component of the fuel cell system. In a particular embodiment, as depicted in FIG. 1, the water transfer device (10) transfers water vapor from a fuel cell (11) effluent stream (12) that contains oxygen and water, to an input stream (13) of the fuel cell. Preferably, the water vapor is transferred from the cathode effluent of the fuel cell. A preferred embodiment of a fuel cell system also comprises a combustor (14), for burning anode fuel cell effluent. Also preferably, the fuel cell system is a hydrocarbon fuel cell plant, embodiments of which are depicted in FIGS. 2, 3 and 4.

As referred to herein, a "fuel cell" may be a single cell for the electrochemical creation of electricity, preferably a PEM fuel cell, using hydrogen and an oxidant or a plurality of cells in a stack or other configuration that allows series connection of the cells so as to produce increased voltage. As referred to herein, a "hydrocarbon fuel cell plant" is an apparatus that comprises a fuel cell and a hydrocarbon fuel processor for providing hydrogen for the fuel cell. As referred to herein, a "hydrocarbon fuel processor" comprises any device that converts a hydrocarbon fuel into hydrogen. In a preferred embodiment, the hydrocarbon fuel cell plant is suitable for use in a motor vehicle. In another preferred embodiment, the hydrocarbon fuel cell plant is suitable for use in a stationary apparatus, such as an emergency or supplemental power generator for home or commercial use.

Preferably, the hydrocarbon fuel processor converts hydrocarbon fuel, using an oxidant and water, to create a stream of hydrogen gas. Preferably, the hydrocarbon fuel is any fuel capable of being reformed to produce hydrogen, including gasoline, diesel fuel, natural gas, methane, butane, propane, methanol, ethanol, or mixtures thereof. (As used herein, the word "include," and its variants, is intended to be non-limiting, such that recitation of items in a list is not to the exclusion of other like items that may also be useful in the apparatuses, devices, components, materials, compositions and methods of this invention.)

Figure 2:
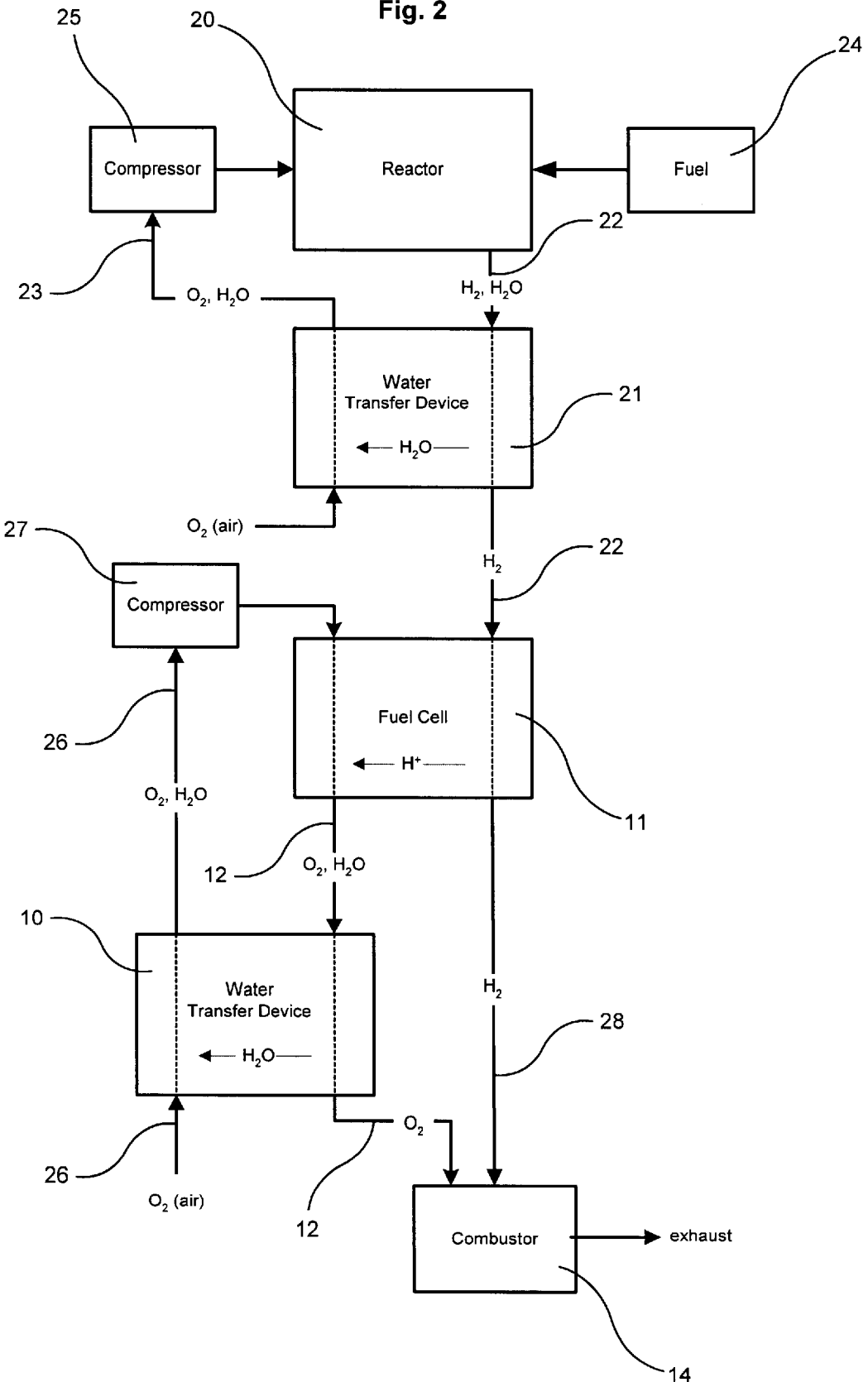
FIG. 2 is a diagram of a preferred embodiment of this invention, comprising a reactor, a water transfer device for transferring water vapor from the reformate output of the reactor to the air input of the reactor, a fuel cell, and a water transfer device for transferring water vapor from the cathode effluent of the fuel cell to the cathode input of the fuel cell.
Figure 3:
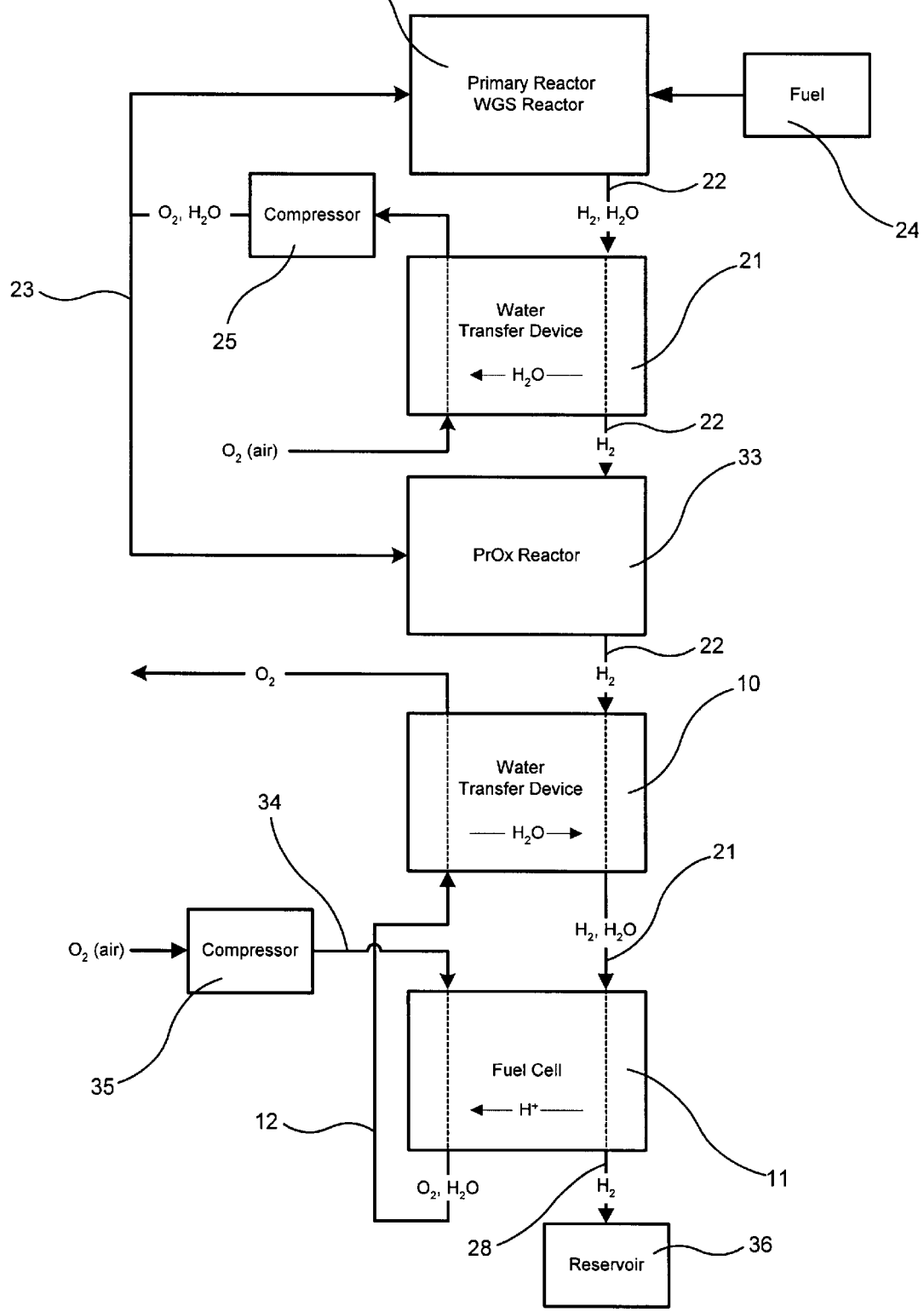
FIG. 3 is a diagram of another preferred embodiment of this invention, comprising a reactor, a water transfer device for transferring water vapor from the reformate output of the reactor to the air input of the reactor, a fuel cell, and a water transfer device for transferring water vapor from the cathode effluent of the fuel cell to the anode input of the fuel cell.
Figure 4:
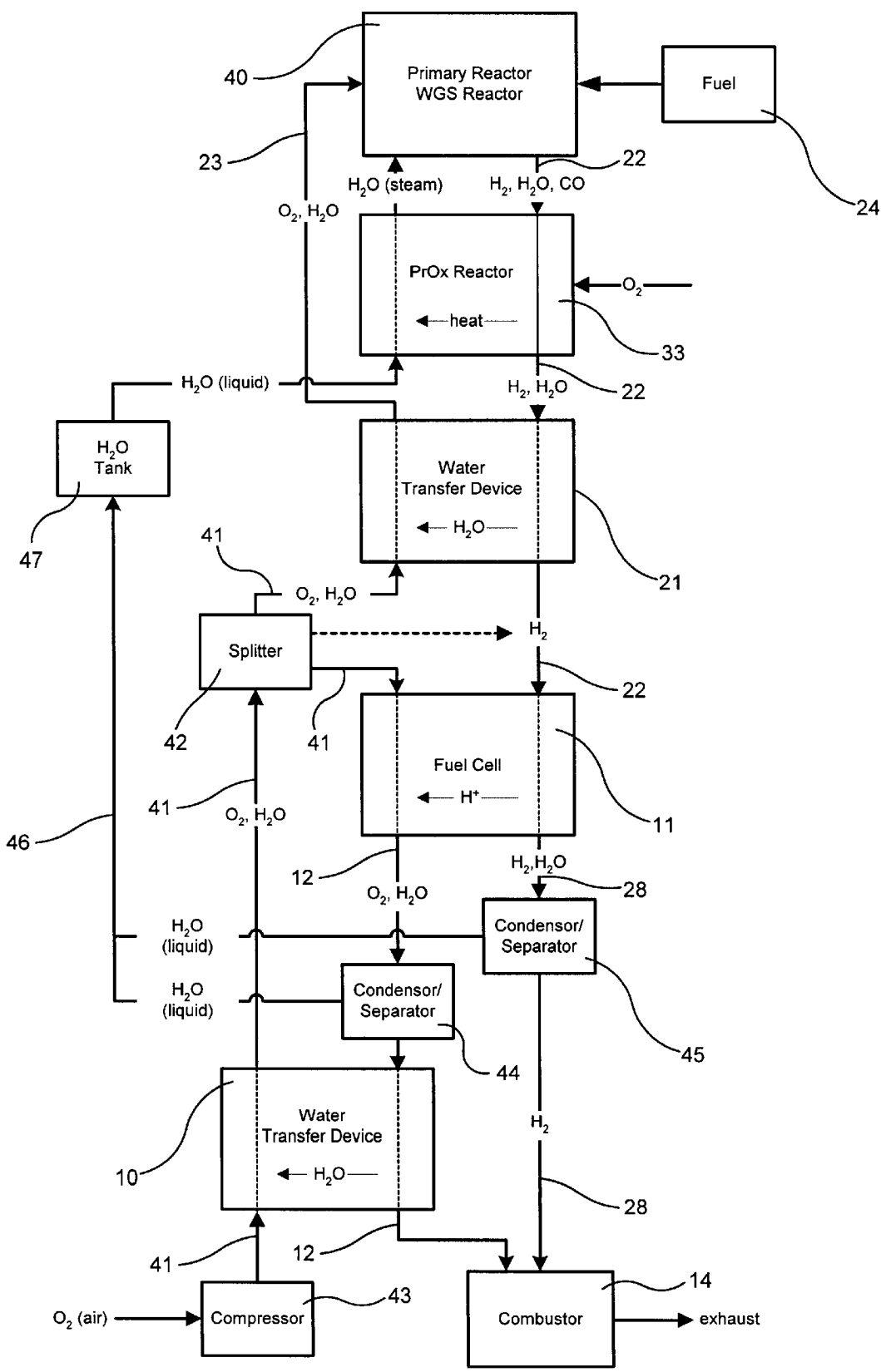
FIG. 4 is a diagram of another preferred embodiment of this invention, comprising a reactor, a water transfer device for transferring water vapor from the reformate output of the reactor to the air input of the reactor, a fuel cell, and a water transfer device for transferring water vapor from the cathode effluent of said fuel cell to a splitter, where the water vapor is further transferred to the air input of the reactor (via the first water transfer device) and to the cathode and (optionally) the anode inputs of the fuel cell.

In particular, as depicted in FIGS. 2, 3 and 4, preferred embodiments of the present invention also provide a power plant fuel processor comprising a reactor 20, 30 or 40 and a water transfer device (21) that transfers water vapor from the reformate produced by the reactor to the input of the reactor. As referred to herein, "reformate" is the gaseous product or effluent comprising hydrogen that is produced by a reactor from a hydrocarbon fuel. In one embodiment, the reformate from the reactor, after passing through the water transfer device, flows to the fuel cell (11). Also in the depicted embodiments, the water vapor is transferred to the reactor as part of the oxidant stream. The transfer may be directly to the input of the reactor or to a device, such as an air moving device, which in turn is connected to the input of the reactor. The water transfer device preferably comprises a water-transfer membrane.

Reactor:

The fuel cell systems of the present invention preferably comprise a reactor that is capable of converting a hydrocarbon fuel to hydrogen for use in a fuel cell. Preferred reactors include steam reforming reactors and autothermal reactors as generally described in the background, above. Among such reactors useful in this invention are those known in the art, such as described in the following documents, all of which are incorporated by reference herein: U.S. Pat. No. 4,650,722, Vanderborgh, et al., issued Mar. 17, 1987; U.S. Pat. No. 6,077,620, Pettit, issued Jun. 20, 2000; and U.S. Pat. No. 6,132,689, Skala et al., issued Sep. 22, 1998; U.S. Pat. No. 6,159,626, Keskula et al., issued Jul. 6, 1999; European Patent Publication 977,293, Skala, et al., published Feb. 2, 2000; and European Patent Publication 1,066, 876, Keskula et al., published Jan. 10, 2001.

The reactor preferably comprises one or more reactors wherein the hydrocarbon fuel (stream 7) undergoes dissociation in the presence of water/steam to produce the reformate. In one such specific embodiment, air is used in a combination partial oxidation/steam reforming reaction. In this case, one or more of the reactors also receive an air stream. Each reactor may comprise one or more sections or reactor beds. A variety of designs are known and usable. Therefore, the selection and arrangement of reactors may vary; exemplary fuel reformation reactor(s) and downstream reactor(s) are further described below.

In an exemplary autothermnal reformation process, gasoline, water (as steam), and oxygen (air) are reacted in a primary reactor to generate hydrogen and carbon dioxide as described earlier in the background. The reactor comprises two sections. One section of the reactor is primarily a partial oxidation reactor (POX) and the other section of the reactor is primarily a steam reformer (SR), although there is some overlap in the type of reactions occurring in the POX and SR sections. The POX reaction is predominantly between fuel and air, having the following general reaction scheme.

$$C_8H_{18} + 4O_2 \rightarrow 8CO + 9H_2$$

This reaction is facilitated by use of a catalyst and is exothermic. A preferred POX catalyst comprises one or more noble metals, Pt, Rh, Pd, Ir, Os, Au, and Ru. Other non-noble metals, or combination of metals, such as Ni and Co, are also useable. The reaction in the POX section is preferably fuel-rich. The hot POX reaction products, along with steam introduced with the fuel, pass into the SR section where the hydrocarbons react with steam according to the following general reaction scheme.

$$C_8H_{18} + 8H_2O \rightarrow 8CO + 17H_2$$

The steam reforming reaction is endothermic. Heat required for this endothermic reaction is provided from the heat that is generated by the exothermic POX reaction and is carried forward into the SR section by the POX section effluent (thus, the name "autothermal reactor").

The primary reformate products from the primary reactor exit the primary reactor, in one embodiment, and are cooled by a heat exchanger that transfers heat from the reformate to the air supplied to the primary reactor. In another preferred embodiment, this heat transfer is effected by the water transfer device, without the use of a separate heat exchanger. Hydrogen is produced, but the gasoline reformation also produces carbon dioxide, water and carbon monoxide. Carbon monoxide, in particular, may have a detrimental effect on the catalyst used in the fuel cell stack. Accordingly, it is preferable to reduce the carbon monoxide content of the product stream.

Preferably, then, the fuel processor also comprises one or more downstream reactors, such as water/gas shift (WGS) reactor and preferential oxidizer (PrOx) reactor, that are used to convert carbon monoxide to carbon dioxide. Preferably, the carbon monoxide is reduced to acceptable levels, preferably below about 20 ppm.

The shift reactor preferably includes one or more sections whose carbon monoxide and water are reacted according to the following general scheme.

$$CO + H_2O \rightarrow CO_2 + H_2$$

In one embodiment, there is provided a high temperature shift section and a low temperature shift section. In one such specific embodiment, the high temperature shift reactor comprises a $Fe_3O_4/Cr_2O_3$ catalyst, and runs at a temperature of from about 400° C. (752° F.) to about 550° C. (1022° F.). In the embodiment, the low temperature shift reactor comprises a $CuO/ZnO/Al_2O_3$ catalyst, and runs at a temperature of from about 200° C. (392° F.) to about 300° C. (572° F.). Preferably, cooling of the reformate stream occurs between the high temperature and the low temperature sections. In other embodiments, the WGS reactor contains a medium temperature shift reactor running at a temperature of from about 300° C. (572° F.) to about 400° C. (752° F.), instead of, or in addition to, the high and low temperature reactors.

Reformate exiting the shift reactor enters a preferential oxidation PrOx reactor where it is catalytically reacted with oxygen through an air supply according to the following general reaction scheme.

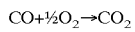

This reaction is conducted to consume essentially all of, or at least most of, the residual carbon monoxide without consuming excess quantities of hydrogen.

An air stream supplied to the fuel processor may be used in one or more of the reactors. For systems with an autothermal reformer, air is supplied to reactor. The PrOx reactor also utilizes air to oxidize carbon monoxide to carbon dioxide, using a noble metal catalyst. Preferably air is supplied from an air moving device, preferably a compressor. The air may be heated, using one or more heat exchanger (s), to the desired temperatures for the primary reactors. In such embodiments, the air for the primary reactor is preferably supplied at a temperature of at least about 700° C. (1292° F.) depending on operating conditions.

In one embodiment, the PrOx hydrogen stream exits the PrOx reactor and is cooled by heat exchanger to a temperature suitable for use in a fuel cell. The hydrogen stream is preferably cooled to a temperature below about 100° C. (212° F.). The hydrogen stream is then fed into the anode chamber of the fuel cell, via the water transfer device, as discussed below. At the same time, oxygen (e.g., air) from an oxidant stream is fed into the cathode chamber of the fuel cell. Preferably, the air is compressed, using a compressor. The hydrogen from the reformate stream and the oxygen from the oxidant stream react in the fuel cell to produce electricity, in an electrochemical reaction in the presence of the catalyst. Water is produced as a by-product of the reaction. Exhaust or effluent from the anode side of the fuel cell contains some unreacted hydrogen. The exhaust or effluent from the cathode side of the fuel cell also contains some unreacted oxygen.

Some of the reactions that occur in the reactors are endothermic and so require heat; other reactions are exothermic and require removal of heat. Typically, the PrOx reactor requires removal of heat. Depending on the type of reformer, one or more of the reactions in the primary reactor are endothermic and require heat be added. This is typically accomplished by preheating one or more of the fuel, water, and air reactants and/or, for a steam reforming reactor, by heating the selected reactors. The system preferably contains heat exchangers to transfer thermal energy from those parts of the system that generate heat, to those that require heat.

The fuel processor optionally comprises a combustor, which may heat the fuel, air and/or water reactants entering the reactor. For fuel processors having a steam reforming reactor, the combustor preferably also heats the reformer, directly or indirectly. In a preferred steam reforming system, the reactor beds are heated by the hot exhaust of the combustor. A preferred embodiment comprising an autothermal reformer does not have a combustor.

The combustor preferably comprises a chamber with an inlet, an exhaust, and a catalyst. Preferably, the source of fuel in the combustor is the unreacted hydrogen in the anode effluent. Additional fuel may be provided directly to the combustor, as needed to meet the transient and steady state needs of the fuel cell apparatus.

The hydrocarbon fuel and/or anode effluent are reacted in the catalyst section of the combustor. Oxygen is provided to the combustor either from the air supply and/or, preferably, the cathode effluent stream, depending on system operating conditions. Preferably, the exhaust from the combustor passes through a regulator and a muffler being released to the atmosphere. In systems where the reactor is heated by the combustor, enthalpy equations are used to determine the amount of cathode exhaust air to be supplied to the combustor so as to provide the heat needed by the reactors. Any oxygen demand required by the combustor that is not met by the cathode effluent is preferably supplied by a compressor in an amount to satisfy the heat and temperature demanded by the combustor.

Water for the reactors is preferably provided by the water transfer device, as further discussed below. However, under certain situations (such as start-up of the system), additional water may be needed. This water is preferably obtained from the anode effluent and cathode effluent, such as using a condenser and a water separator. Liquid water is then stored in a reservoir. Water may also be added to the reservoir from external sources.

Preferably, the various aspects of the operation of the system are controlled using a suitable microprocessor, microcontroller, personal computer, etc., which has central processing unit capable of executing a control program and data stored in a memory. The controller may be a dedicated controller specific to any of the components, or implemented in software stored in a main vehicle electronic control module. Further, although software based control programs are usable for controlling system components in various modes of operation as described above, it will also be understood that the control can also be implemented in part or whole by dedicated electronic circuitry.

Fuel Cell:

The apparatus of the present invention comprises a fuel cell, which converts electrochemical energy, from the reaction of reducing and oxidizing chemicals, into electricity. Preferably the fuel cells used in the present invention use hydrogen and air as the reducing and oxidizing materials to produce electrical energy, and water. The cell generally comprises an anode electrode and a cathode electrode separated by an electrolyte. Hydrogen is supplied to the anode electrode, and oxygen (or air) is supplied to the cathode electrode. The hydrogen gas is separated into electrons and hydrogen ions (protons) at the anode. The hydrogen ions pass through the electrolyte to the cathode; the electrons travel to the cathode through the power circuit (e.g., to a motor). At the cathode, the hydrogen ions, electrons, and oxygen then combine to form water. The reactions at the anode and cathode are facilitated by a catalyst, typically platinum.

A preferred electrolyte is a proton exchange membrane (PEM), which comprises a thin polymer membrane that is permeable to protons but not electrons. A preferred membrane material is an ion exchange resin such as a perfluoronated sulfonic acid. A particularly preferred membrane material is a perfluoronated sulfonic acid polymer sold as NAFION™ by the E. I. DuPont de Nemeours & Co.

The membrane in the PEM fuel cell is part of a membrane electrode assembly (MEA) having the anode on one face of the membrane, and the cathode on the opposite face. The MEA is sandwiched between a pair of electrically conductive elements that serve as current collectors for the anode and cathode, and contain appropriate channels and/or openings for distribution of the fuel cell's gaseous reactants over the surfaces of the respective anode and cathode catalysts.

In one embodiment, the anode and cathode comprise a film made of finely divided catalytic particles, supported on carbon particles, and admixed with a proton conductive resin, preferably a perfluoronated sulfonic acid polymer such as NAFION™. In another embodiment, the anode and cathode comprise a film made of finely divided catalytic particles dispersed throughout a polytetrafluoroethylene (PTFE) binder. The catalytic particles are typically precious metal particles, such as platinum. Such MEAs require controlled operating conditions, including humidification, to facilitate efficient energy production and to prevent degradation of the membrane and catalysts. Fuel cells among those useful herein are described in the following documents, all of which are incorporated by reference herein: U.S. Pat. No. 3,134,697, Niedrach, issued May 26, 1964; U.S. Pat. No. 5,272,017, Swathirajan et al., issued Dec. 21, 1993, and U.S. Pat. No. 5,316,871, Swathirajan et al., issued May 31, 1994; and *Journal of Power Sources*, Volume 29 (1990) pages 367–387.

Preferably, the fuel cells used in the present invention comprise a plurality of fuel cells electrically connected in series for increasing voltage. This combination is preferably arranged in a "stack" surrounded by an electrically insulating frame. In a preferred embodiment, individual MEAs are sandwiched between sheets of porous, gas-permeable, conductive material which press against the anode and cathode faces of the MEA and serve as (a) the primary current collectors for the anode and cathode, and (b) mechanical support for the MEA. The bipolar plates each include flow fields having a plurality of flow channels formed in the faces of the plates for distributing fuel and oxidant gases, e.g., hydrogen-containing reformate and oxygen (air), to the reactive faces of the MEAs. Nonconductive gaskets or seals provide a seal and electrical insulation between the several plates of the fuel cell stack. Preferred primary current collector sheets comprise carbon or graphite paper or cloth, fine mesh noble metal screen, open cell noble metal foams, and similar materials that conduct current from the electrodes while allowing gas to pass through. This assembly is referred to as the MEA/primary current collector assembly herein.

The MEA/primary current collector assembly is pressed between a pair of non-porous, electrically conductive plates or metal sheets which serve as secondary collectors for the current from the primary current collectors and conducting current between adjacent cells internally of the stack (i.e., in the case of bipolar plates) and at the ends of a cell externally of the stack (i.e., in the case of monopolar plates). The secondary current collecting plate contains a flow field that distributes the gaseous reactants, e.g., hydrogen-containing reformate and oxygen (air), over the surfaces of the anode and cathode. These flow fields generally include a plurality of lands which engage the primary current collector and define therebetween a plurality of flow channels through which the gaseous reactants flow between a supply header at one end of the channel and an exhaust header at the other end of the channel. Because the reaction of water and hydrogen also produces heat, the fuel cell stack must also be cooled.

An oxidant gas such as oxygen or air is supplied to the cathode side of the fuel cell stack from a storage tank via appropriate supply plumbing. Similarly, hydrogen (e.g., essentially pure, or reformate) is supplied to the anode side of the fuel cell via appropriate supply plumbing. Exhaust plumbing for both the fuel and oxidant of the MEAs is also provided for removing hydrogen-depleted anode gas (herein "anode effluent") from the anode flow field and oxygen-depleted water-containing cathode gas (herein "cathode effluent") from the cathode flow field. Coolant plumbing and is provided for supplying and exhausting liquid coolant to the bipolar plates and, as needed. Arrangements of multiple cells in a stack among those useful herein are described in U.S. Pat. No. 5,763,113, Meltser et al., issued Jun. 9, 1998; and U.S. Pat. No. 6,099,484, Rock, issued Aug. 8, 2000.

Water Transfer Device:

The present invention also provides a water transfer device that transfers water vapor from a wet gas stream to a dry gas stream. The water transfer devices of this invention comprise a structure comprising a flow path for a primary gas, a flow path for secondary gas, and a water transfer membrane having a first and second surface, wherein the first surface of the membrane is in substantial contact with the flow path for the primary gas, and the second surface is in substantial contact with the second flow path. Water vapor in a gas travelling in one flow path (e.g., the first flow path) is transferred through the membrane to the other flow path (e.g., the second flow path). A preferred water transfer device such as the one depicted in FIG. 5, for the transfer of water vapor between a primary gas and a secondary gas in a fuel cell system, comprises:

(a) a primary gas inlet (51);

(b) a primary gas outlet (52);

(c) a conduit (53) having an inner void (54) and outer surface (55), the walls of which comprise a water transfer membrane material, wherein one end of the conduit is connected to the primary gas inlet (51), and the other end of the conduit is connected to the primary gas outlet (52) so as to allow for the flow of a primary gas through the inner void; and (d) a housing (56) which encloses and provides a void space (57) around at least a portion of the outer surface of said conduit (53), wherein said housing has a secondary gas inlet (58) and a secondary gas outlet (59) allowing for the flow of a secondary gas through said void space (57); wherein secondary gas flowing through the void space of said housing passes over an outer surface of said conduit (53), but does not substantially mix with primary gas flowing through the inner void (54) of said conduit.

The conduits (53) may be any of a variety of shapes, including substantially cylindrical tubes, and three dimensional rectangular (block) passages. Preferably the water transfer device comprises a plurality of conduits (60), which are connected to a plenum (61) at the primary gas inlet and a plenum (62) at the primary gas outlet, so as to allow the flow of primary gas through all of the conduits. As used herein, the term "connected" refers to any mechanism which allows the passage of fluid from one point to another, preferably without substantial loss of fluid. The device preferably also comprises a mechanism for supporting the conduits in the housing. Preferably the direction of flow of the primary gas is in a substantially different, preferably essentially opposite, direction than the flow of the secondary gas.

Figure 5:
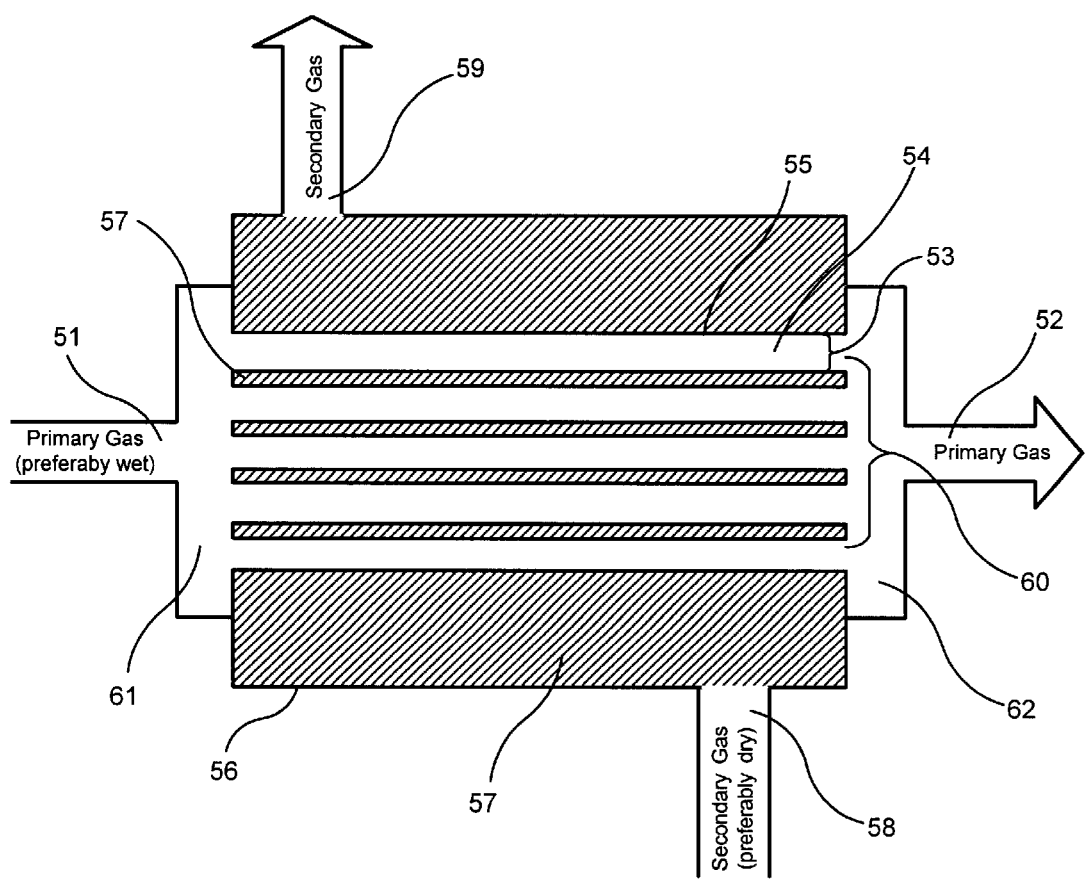
FIG. 5 depicts a cross sectional view of a water transfer device among those useful in this invention.

The water transfer membrane material useful herein is any material that allows the transfer of water vapor from one gas to another. Preferably, such material selectively allows the transfer of water vapor, without also allowing the transfer of other gasses. A preferred water transfer membrane selectively allows the transfer of water vapor from a stream of primary gas to a stream of secondary gas, without allowing significant passage (leaking) of other components from the primary gas stream to the secondary stream. Preferably, as depicted in FIG. 5, the primary gas is the wet gas stream, from which water vapor is transferred to the secondary gas, which is the dry gas stream. Preferably for water transfer devices that transfer water vapor from reformate to an input of a reactor, the primary gas is reformate and, preferably, the secondary gas is air. Preferably, for water transfer devices that transfer water vapor from a fuel cell effluent to another, part of the fuel cell system, the primary gas is cathode effluent and, preferably, the secondary gas is air.

Preferred water transfer membrane materials useful herein include those made from poly[perfluorosulfonic] acid, sulfonated polystyrene, polyethersulfone, sulfonated polyetherketone, polycarbonates, other sulfonated materials, and mixtures thereof. A preferred membrane material is comprised of poly[perfluorosulfonic] acid. A particularly preferred membrane material is sold under the brand name "NAFION" by the E. I. DuPont de Nemours Company. Tubes useful herein made of NAFION membrane are and sold under the brand name "PD SERIES MOISTURE EXCHANGERS" by Perma Pure, Inc.

Preferably the pressure of the primary gas in the conduit is from about 50% to about 500%, more preferably from about 100% to about 300%, more preferably from about 170% to about 270%, of the pressure of the secondary gas in the housing. Also preferably, the temperature of the dry gas stream is less than or equal to the temperature of the wet gas stream. In a preferred embodiment, the dry gas stream is air, preferably at a temperature less than about 85° C. (185° F.), more preferably less than about 50° C. (122° C.), more preferably less than about 30° C. (86° F.). Preferably the dry gas stream is air at about ambient temperature and at about ambient pressure.

Preferably the temperature of the wet gas stream at the input of the water transfer device, is maintained at a temperature above the dew point of the gas, so that water does not condense in the water transfer device. Preferably the temperature of the wet gas stream at the inlet of the water transfer device is from about 1° C. (1.8° F.) to 10° C. (18° F.), more preferably from about 1° C. (1.8° F.) to about 5° C. (9° F.), above its dew point.

Preferably, the water transfer efficiency of the water transfer device of this invention is at least about 30% preferably at least about 50%, more preferably at least about 80%, more preferably at least about 90%. As referred to herein, "water transfer efficiency" is the ratio of $dW_{act}/dW_{max}$, where $dW_{act}$ is the amount of water actually transferred from the dry gas stream to the wet gas stream, and $dW_{max}$ is the maximum amount of water that theoretically could have been transferred. The amount of water transferred may be determined using conventional measurements of water content of gaseous streams, known in the art. The maximum amount of water $dW_{max}$ is the lesser of the maximum amount of water that can be absorbed by the dry gas stream (at a given operating temperature and pressure), and the actual amount of water in the input wet gas stream.

A preferred fuel processor embodiment also comprises an air moving device, such as a compressor or blower for supply of air to the reactor (e.g., the primary and PrOx reactors). In embodiments in which the water transfer device humidifies the air for the reactor, the water transfer device may humidify the air after it has been compressed (i.e., the device is connected to the output of the compressor) or, preferably, it may humidify the air before it compressed (i.e., the device is connected to the input of the compressor).

In a preferred embodiment of the invention, as depicted in FIG. 2, a first water transfer device (21) transfers water vapor from hydrogen reformate (22, the primary gas flowing through the water transfer device) made by a reactor (20), containing water as a by-product of the reformate reactions. The water vapor is transferred to the air input stream (23), the secondary gas flowing through the water transfer device) for the reactor. The reactor (20) comprises a primary reactor (e.g., an autothermal reformer), preferably in combination with a water/gas shift (WGS) reactor and a preferential oxidation (PrOx) reactor. Fuel to the reactor is provided from a fuel tank (24). The reformate (22) is passed through the water transfer device (21) immediately after exiting either the WGS or the PrOx reactor. Preferably, the air stream (23) supplied to the water transfer device is ambient air, at ambient pressure. The air passes through an air moving device, preferably a compressor (25) prior to introduction to those components of the reactor that require air (e.g., the primary reactor and the PrOx reactor). After passing through the water transfer device, the reformate (22) is supplied to the anode input of a fuel cell (11), preferably a fuel cell stack.

The fuel cell system of the embodiment depicted in FIG. 2 also comprises a second water transfer device (10). The second water transfer device (10) is connected to the cathode output of the fuel cell (11) and transfers water vapor from the cathode effluent (12, the primary gas in the water transfer device) to an air stream (26, the secondary gas in the water transfer device). The air stream (26) is supplied to the water transfer device (10) at ambient temperature and pressure. After humidification, the air stream is compressed with a compressor (27), and is supplied to the cathode input of the fuel cell (11). After passing through the water transfer device (10), the cathode effluent (12), along with the anode effluent (28) is supplied to a combustor (14).

Accordingly, a preferred fuel cell system comprises:
(a) a fuel cell comprising an anode input for a hydrogen-containing anode supply stream which is preferably reformate, a cathode input for an oxidant-containing cathode supply stream, which is preferably air, and a cathode output for a cathode effluent which comprises water produced by the fuel cell; and
(b) a water transfer device connected to either or both of the fuel cell inputs, preferably to the cathode input, wherein the water transfer device transfers water from the cathode effluent to either or both of the anode supply stream or the cathode supply stream.

More specifically, a preferred fuel cell system comprises:
(a) a fuel cell having an anode input for an anode supply stream, a cathode input for a cathode supply stream, and a cathode output for cathode effluent that comprises water produced by the fuel cell; and
(b) a water transfer device comprising (i) a device cathode effluent input connected to the cathode output of the fuel cell, (ii) a device supply stream output connected to one or both of the inputs of the fuel cell, and (iii) a water-transfer membrane;

wherein the water transfer device transfers water from the cathode effluent to one or both of the fuel cell supply streams. A preferred embodiment of this invention comprises the transfer of water vapor from the cathode effluent to the cathode supply stream. Another preferred embodiment comprises the transfer of water vapor from the cathode effluent to the anode supply stream. Preferably, the temperature of the cathode effluent at the device input is not significantly greater than the temperature of the effluent at the cathode output of the fuel cell. Accordingly, preferably, the cathode effluent does not pass through a combustor prior to entering the water transfer device. Also, in another preferred embodiment, the air output of the water transfer device passes through an air moving device, preferably a compressor, before entering the cathode input of the fuel cell.

In another preferred embodiment of the invention, as depicted in FIG. 3, a first water transfer device (21) transfers water from reformate (22) to the air supply (23) for a primary reactor (30), which comprises an autothermal reactor and a water-gas shift (WGS) reactor. The reformate (22) is then supplied to the water transfer device (21). Preferably, the air stream (23) supplied to the water transfer device is ambient air, at ambient pressure. After humidification in the water transfer device, the air is compressed in an air moving device, preferably a compressor (25) prior to introduction to the primary reactor (30) and a preferential oxidation (PrOx) reactor (33). After passing through the water transfer device, the reformate (22) passes through the PrOx reactor, and is then supplied to the anode input of a fuel cell (11), preferably a fuel cell stack.

In this embodiment, the fuel cell system comprises a second water transfer device (10). The second water transfer device (10) is connected to the cathode output of the fuel cell (11), and transfers water vapor from cathode effluent (12) to the reformate (22) after the reformate exits the PrOx (33). Air (34), as the oxidant-containing gas, is supplied to the fuel cell from a compressor (35). After humidification, the reformate (22) is supplied to the anode input of the fuel cell (11). After passing through the water transfer device (10), the cathode effluent (12) is vented to the atmosphere. The anode effluent (28) is supplied to a hydrogen reservoir (36), which stores or otherwise disposes of any unreacted hydrogen in the anode effluent. Optionally, the cathode effluent and anode effluent are supplied to a combustor.

Accordingly, a preferred embodiment of this invention is a fuel cell power plant, comprising:
(a) a reactor having a reactant input for a reactor oxidant stream supplied to the reactor, and a reactor reformate output for a reformate stream produced by the reactor;
(b) a first water transfer device comprising (i) a first device reformate input connected to said reactor reformate output, (ii) a first device reformate output; (iii) a first device oxidant input; (iv) a first device oxidant output connected to said reactant input of the reactor; and (v) a water-transfer membrane; wherein said water transfer device transfers water from the reformate stream to the reactor oxidant stream;
(c) a fuel cell comprising an anode input for an anode reformate supply stream, a cathode input for a cathode oxidant supply stream, an anode output for an anode effluent; and a cathode output for a cathode effluent; and
(d) a second water transfer device comprising (i) a second device reformate input connected to the first device reformate output; (ii) a second device reformate output connected to the anode input of the fuel cell stack; (iii) a second device effluent input connected to one or both of the effluent outputs of the fuel cell; (iv) a second device effluent output; and (v) a water transfer membrane; wherein said second water transfer device transfers water from one or both of said effluent streams to said anode reformate supply stream. Preferably, in this embodiment, the second water transfer device transfers water from the cathode effluent stream to the reformate supply stream.

In another preferred embodiment of the invention, as depicted in FIG. 4, a first water transfer device (21) transfers water from reformate (22) to the air supply (23) for a reactor (40). The reactor (40) preferably comprises a primary reactor and a water-gas shift (WGS) reactor, wherein reformate produced by the primary reactor flows through the WGS reactor. Preferably the primary reactor is an autothermal reactor. After exiting the WGS reactor, the reformate (22) passes through a preferential oxidation (PrOx) reactor (33), and enters the first water transfer device (21). After exiting the first water transfer device (21), the reformate (22) is supplied to the anode of a fuel cell (11), preferably a fuel cell stack.

The air stream (41) supplied to the first water transfer device (21) flows from a second water transfer device (10) through a splitter (42). After humidification by the first water transfer device, air is supplied to the primary reactor and the WGS reactor (40).

The second water transfer device (10) transfers water from the cathode effluent (12) of the fuel cell (11) to the air stream (41) that is supplied to the splitter (42). Air supplied to the second water transfer device (10) is preferably provided by an air moving device, preferably a compressor (43). The splitter (42) diverts a portion of the air stream (41) to the cathode input of the fuel cell (11), and a portion to the first water transfer device (21). Optionally, water may also be provided by the splitter (42) to the anode input of the fuel cell (22). Accordingly, the second water transfer device (10) provides humidified air to the stack, and also augments humidification of air supplied to the primary and WGS reactors (40) through the first water transfer device (21).

Also in this embodiment, the anode and cathode effluents pass through condensor/separators (44 and 45) to extract liquid water (46) from the anode and cathode effluents. The liquid water (46) is stored in a water tank (47), for use during start-up of the reactors (40). Optionally, the cathode effluent (12), after passing through the second water transfer device (10) is supplied to a combustor (14), along with anode effluent (28).

Accordingly, a preferred embodiment of this invention is a fuel cell power plant, comprising:
(a) a reactor having a reactant input for a reactor oxidant stream supplied to the reactor, and a reactor reformate output for a reformate supply stream produced by the reactor;
(b) a first water transfer device comprising (i) a first device reformate input connected to said reactor reformate output, (ii) a first device reformate output; (iii) a first device oxidant input for a first oxidant supply stream; (iv) a first device oxidant output connected to said reactant input of the reactor; and (v) a water-transfer membrane;
(c) a fuel cell comprising an anode input for the reformate supply stream, a cathode input for a cathode oxidant stream, an anode output for an anode effluent stream; and a cathode output for a cathode effluent stream; and
(d) a second water transfer device comprising (i) a second device cathode effluent input connected to the cathode output of the fuel cell, (ii) a second device cathode effluent output, (iii) a second device oxidant input for a second oxidant supply steam, (iv) a second device oxidant output, connected to said first device oxidant gas input, and (v) a water transfer membrane; wherein the first water transfer device transfers water from the reformate stream to the reactor oxidant stream, and wherein the second water transfer device transfers water from the cathode effluent to the first oxidant supply stream and to the cathode oxidant stream.

The examples and other embodiments described herein are exemplary and not intended to be limiting in describing the full scope of apparatuses, devices, components, materials, compositions and methods of this invention. Equivalent changes, modifications and variations of specific embodiments, materials, compositions and methods may be made with substantially similar results.

What is claimed is:

1. A fuel cell power plant, comprising:
   (a) a reactor having a reactant input for a reactor oxidant stream, and a reactor reformate output for a reformats supply stream; and
   (b) a first water transfer device comprising (i) a first device reformats input connected to said reactor reformats output, (ii) a first device reformate output, (iii) a first device oxidant gas input, (iv) a first device oxidant gas output connected to said reactant input of the reactor, and (v) a water-transfer membrane, wherein said water transfer device transfers water from said reformate gas stream to said reactor oxidant stream;
   (c) a fuel cell comprising an anode input for said reformate supply stream, a cathode input for a cathode oxidant stream, an anode output for an anode effluent stream; and a cathode output for a cathode effluent stream; and
   (d) a second water transfer device comprising (i) a second device reformats gas input connected to said first reformats gas output of the first water transfer device, (ii) a second device reformate gas output connected to said anode input of the fuel cell stack, (iii) a second device effluent input connected to one or both of said effluent outputs of the fuel cell stack, (iv) a second device effluent output, and (v) a water transfer membrane; wherein said second water transfer device transfers water from one or both of said effluent streams to said reformats supply stream.

2. A fuel processor according to claim 1, wherein said water transfer membrane comprises poly[perfluorosulfonic] acid.

3. A fuel cell power plant according to claim 1, wherein said reactor oxidant stream comprises air.

4. A fuel cell power plant according to claim 3, wherein the temperature of said reactor oxidant stream is less than about 50° C.

5. A fuel cell power plant according to claim 1, wherein said reactor comprises an autothermal reactor.

6. A fuel cell power plant according to claim 5, wherein said reactor additionally comprises a water-gas shift reactor and a preferential oxidation reactor, and wherein said autothermal reactor produces reformate which is supplied, in series, to said water-gas shift reactor and to said preferential oxidation reactor, and wherein said first water transfer device transfers water from said reformate stream after said reformate exits said water-gas shift reactor and before said reformate enters said preferential oxidation reactor.

7. A fuel cell power plant according to claim 5, wherein said reactor additionally comprises a water-gas shift reactor and a preferential oxidation reactor, and wherein said autothermal reactor produces reformate which is supplied, in series, to said water-gas shift reactor and to said preferential oxidation reactor, and wherein said first water transfer device transfers water from said reformate stream after said reformats exits said preferential oxidation reactor.

8. A fuel cell power plant according to claim 1, additionally comprising an air moving device connected to said cathode input, wherein an air supply stream flows through said air moving device before entering said cathode input, and wherein said second water transfer device is connected to the input of said compressor and transfers water to said supply stream prior to the entry of said stream into said air moving device.

9. A fuel cell power plant, comprising:
   (a) a reactor having a reactant input for a reactor oxidant stream, and a reactor reformats output for a reformate supply stream; and
   (b) a first water transfer device comprising (i) a first device reformate input connected to said reactor reformats output, (ii) a first device reformats output; (iii) a first device oxidant gas input for a first oxidant supply stream; (iv) a first device oxidant gas output connected to said reactant input of the reactor; and (v) a water-transfer membrane;
   (c) a fuel cell comprising an anode input for said reformats supply stream, a cathode input for a cathode oxidant stream, an anode output for an anode effluent stream; and a cathode output for a cathode effluent stream; and
   (d) a second water transfer device comprising (i) a second device cathode effluent input connected to said cathode output of the fuel cell, (ii) a second device cathode effluent output, (iii) a second device oxidant gas input for a second oxidant supply stream, (iv) a second device oxidant gas output, connected to said first device oxidant gas input, and (v) a water transfer membrane; wherein said first water transfer device transfers water from said reformate stream to said reactor oxidant stream, and wherein said second water transfer device transfers water from said cathode effluent to said first oxidant supply stream and to said cathode oxidant stream.

10. A fuel processor according to claim 9, wherein said water transfer membrane comprises poly[perfluorosulfonic] acid.

11. A fuel cell power plant according to claim 9, wherein said reactor oxidant stream comprises air.

12. A fuel cell power plant according to claim 9, wherein said reactor comprises an autothermal reactor.

13. A fuel cell power plant according to claim 12, wherein said reactor additionally comprises a water-gas shift reactor and a preferential oxidation reactor, and wherein autothermal reactor produces reformats which is supplied, in series, to said water-gas shift reactor and to said preferential oxidation reactor, and wherein said first water transfer device transfers water from said reformate stream after said reformats exits said water-gas shift reactor and before said reformats enters said preferential oxidation reactor.

14. A fuel cell power plant according to claim wherein said reactor additionally comprises a water-gas shift reactor and a preferential oxidation reactor, and wherein autothermal reactor produces reformate which is supplied, in series, to said water-gas shift reactor and to said preferential oxidation reactor, and wherein said first water transfer device transfers water from said reformats stream after said reformate exits said preferential oxidation reactor.

15. A fuel cell power plant according to claim 9, additionally comprising an air moving device connected to said second device oxidant gas input, wherein said second oxidant supply stream flows through said air moving device before entering said second device oxidant gas input.

16. A fuel cell power plant comprising:
   (a) a reactor for the production of a reformate supply stream using a reactant stream comprising a reactor oxidant stream and a reactor hydrocarbon fuel stream, wherein said reformate supply stream comprises water;
   (b) a first water transfer device that transfers water from said reformate supply stream to a one or both of said reactant streams, comprising a water-transfer membrane;

(c) a fuel cell comprising an anode input for said reformate supply stream, a cathode input for a cathode oxidant supply stream, an anode output for an anode effluent stream, a cathode output for an cathode effluent stream, wherein either or both of said anode effluent and said cathode effluent comprise water produced by said fuel cell;

(d) a second water transfer device, connected to said fuel cell, that transfers water from one or both of said effluent streams to said reactor oxidant stream comprising air, and optionally to one or more of said reformate supply stream and said cathode oxidant supply stream; and (e) wherein said second water transfer device is connected to said reactor through said first water transfer device for transferring water to said reactor oxidant stream.

17. A fuel cell power plant according to claim 16, wherein said air is at a temperature less than about 50° C.

18. A fuel processor according to claim 17, wherein said air is at about ambient temperature.

19. A fuel cell power plant comprising:

(a) a reactor for the production of a reformate supply stream using a reactant stream comprising a reactor oxidant stream and a reactor hydrocarbon fuel stream, wherein said reformate supply stream comprises water;

(b) a first water transfer device that transfers water from said reformate supply stream to a one or both of said reactant streams, comprising a water-transfer membrane;

(c) a fuel cell comprising an anode input for said reformate supply stream, a cathode input for a cathode oxidant supply stream, an anode output for an anode effluent stream, a cathode output for an cathode effluent stream, wherein either or both of said anode effluent and said cathode effluent comprise water produced by said fuel cell;

(d) a second water transfer device, connected to said fuel cell, that transfers water from one or both of said effluent streams to one or more of said reactor oxidant stream, said reformate supply stream, and said cathode oxidant supply stream; and (e) wherein said reactor comprises an autothermal reformer, a water-gas shift reactor and a preferential oxidation reactor, and wherein said autothermal reactor produces reformats which is supplied, in series, to said water-gas shift reactor and to said preferential oxidation reactor, and wherein said first water transfer device transfers water from said reformate supply stream after said reformats exits said water-gas shift reactor and before said reformate enters said preferential oxidation reactor.

20. A fuel cell power plant comprising;

(a) a reactor for the production of a reformats supply stream using a reactant stream comprising a reactor oxidant stream and a reactor hydrocarbon fuel stream, wherein said reformate supply stream comprises water;

(b) a first water transfer device that transfers water from said reformate supply stream to a one or both of said reactant streams, comprising a water-transfer membrane;

(c) a fuel cell comprising an anode input for said reformats supply stream, a cathode input for a cathode oxidant supply stream, an anode output for an anode effluent stream, a cathode output for an cathode effluent stream, wherein either or both of said anode effluent and said cathode effluent comprise water produced by said fuel cell;

(d) a second water transfer device, connected to said fuel cell, that transfers water from one or both of said effluent streams to one or more of said reactor oxidant stream, said reformats supply stream, and said cathode oxidant supply stream; and (e) wherein said reactor comprises an autothermal reformer, a water-gas shift reactor and a preferential oxidation reactor, and wherein said autothermal reactor produces reformate which is supplied, in series, to said water-gas shift reactor and to said preferential oxidation reactor, and wherein said first water transfer device transfers water from said reformate supply stream after said reformate exits said preferential oxidation reactor.

* * * * *